United States Patent [19]

Wennberg et al.

[11] 4,027,378
[45] June 7, 1977

[54] REMOVING DEPOSITED MATERIAL FROM THE EDGE PORTIONS OF A PLATE

[76] Inventors: Olov Carl Gustav Wennberg, 16, Champ du Vert Chasseur, B-1180 Brussels, Belgium; Nils Harald Runfeldt, Lorensbergsgatan 11, S-654 68 Karlstad, Sweden

[22] Filed: Nov. 10, 1975

[21] Appl. No.: 630,727

Related U.S. Application Data

[62] Division of Ser. No. 438,715, Feb. 1, 1974, abandoned.

[30] Foreign Application Priority Data

Feb. 8, 1973  Sweden .......................... 7301756

[52] U.S. Cl. .............................. 29/427; 204/12; 204/281; 225/98
[51] Int. Cl.² .......................................... B23P 19/02
[58] Field of Search ............ 29/426, 427, 414, 81, 29/423, 415; 51/80 R, 80 A, 206 P, 34 R, 34 G; 204/12, 13, 281; 156/584; 90/11, 12, 83, 30; 72/204; 225/98, 99

[56] References Cited

UNITED STATES PATENTS

| 1,580,198 | 4/1926 | Harrison .............................. 204/13 |
| 2,583,100 | 1/1952 | Wilson .......................... 204/12 UX |
| 3,187,467 | 6/1965 | Cortesi .................................. 51/34 |
| 3,693,236 | 9/1972 | Kapell et al. ......................... 29/423 |

*Primary Examiner*—James R. Duzan
*Attorney, Agent, or Firm*—Young & Thompson

[57] ABSTRACT

Deposited material is removed from an edge of a plate in the form of a strip, by positioning against the edge of the plate the periphery of a roller that has corrugations along its periphery, the corrugations having sharp edges that extend all the way around the periphery of the roller. The edge of the plate is disposed at an acute angle to the axis of the roller at least at the point of contact of the roller with the edge, and the roller is rotated about its axis in a direction to remove material from the edge of the plate in a direction edgewise away from the plate. The roller is then moved along the plate in a direction parallel to the edge of the plate while maintaining the periphery of the roller in contact with the edge of the plate. Preferably, the axis of the roller is disposed at an acute angle to the plane of the plate.

2 Claims, 7 Drawing Figures

REMOVING DEPOSITED MATERIAL FROM THE EDGE PORTIONS OF A PLATE

This application is a division of our copending application Ser. No. 438,715, filed Feb. 1, 1974 and now abandoned.

The present invention relates to the removal of deposited material from the edge portions of a sheet or band-shaped plate, especially a deposit produced electrolytically on a cathode plate. Such deposits are obtained on the electrolytic refining of copper, for example. In that connection raw copper is dissolved in an electrolyte at the anodes in an electrolyte cell, while pure copper is deposited on the cathode units, the main portion of which may consist of an originally thin sheet of pure copper, which is the active part of so-called "starting plates". Starting plates are manufactured by electrolytic depositing on so-called "parent plates". During electrolysis a layer of copper is formed on the mother plate, which can also consist of copper or another metal, e.g. titanium. The deposit must be separated from the parent plate, which takes place by so-called "stripping". In order to carry out this, the parent plate is provided with fractural impressions in the form of V-shaped grooves along the side edges and under edge. The deposit around the edge portions, forming in general U-shaped strips, is usually removed first, before the starting plate itself is stripped. Removal of the edge strips has previously been done by hand with tongs, which is both time-consuming and laborious. It is primarily for the facilitation of this procedure that the device according to the present invention has been conceived. The invention can meanwhile even be applied in other cases, namely as soon as it is a question of removing deposits on the edges of a plate, band or the like. The invention can also be put to use on the direct depositing of copper on a plate without intermediate manufacture of starting plates.

The device for practicing the method of the present invention is characterized according to the invention first of all by a roller provided with corrugations or teeth around its periphery, the roller being carried by a shaft on a holder which is guided for movement parallel with the plate edge, while the roller is rotatable on the holder in a plane which forms such an angle with the edge, that when the roller is moved with the help of the holder along the edge, with the peripheral corrugations or teeth in engagement with the deposit on the flat side of the plate adjacent to the edge, this deposit is forced outwards from the edge.

Cases may be imagined where there is a deposit only on the one side of a plate, or on both sides but not on the edge surface itself. In this case it can be sufficient with a single roller for removing edge deposits. With deposits which are produced electrolytically, it is generally the rule that there are deposits on both sides and also on the edge surface itself. It is then suitable that the device is provided with rollers for engagement with the deposit on both sides of the plate at the same time, the shafts of both rollers being affixed to one and the same holder. The rollers can be rotatable on their shafts or fixed to them, in the latter case the shafts can be connected to some driving mechanism.

Some examples of the application of the invention are shown on the drawings.

Figure 1:
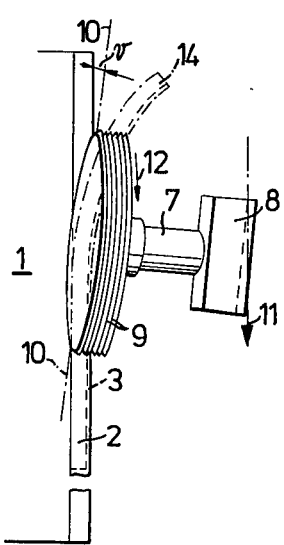
FIG. 1 shows in plan a parent plate having remaining edge deposits, and a device for practicing the method according to the invention in action while removing deposited material from a side edge of the plate.
Figure 2:
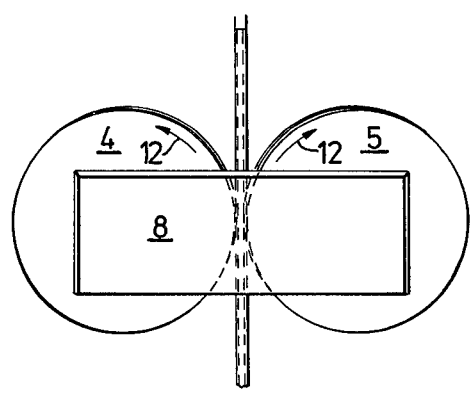
FIG. 2 shows the device in plan seen from the right in FIG. 1, whereat the plane of projection coincides with the side edge plane of the plate.
Figure 3:
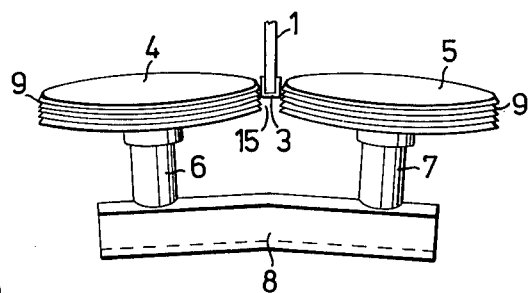
FIG. 3 shows the device seen from above in FIG. 2.

On the drawings the numeral 1 denotes a plate, e.g. a parent plate for manufacturing starting plates for electrolytic copper refining, and 2 a deposit covering the side edge portions and under edge portions as well as the side surface 3 itself of the plate. A pair of rollers is denoted by 4 and 5, which in the embodiment according to FIGS. 1-3 are rotatably mounted on shafts 6,7 attached to a common holder 8 for the rollers. The rollers are provided with a generally cylindrical peripheral surface which is formed with corrugations or teeth 9 with sharp edges going all the way round, said teeth or corrugations being intended when in operation to be in engagement with the edge deposit 2, which is to be removed. The roller shafts are at such a distance from each other that the least mutual distance between the peripheries of the rollers corresponds to the thickness of plate 1 including deposit 2.

In FIG. 1 is shown a plate 1, from which generally U-shaped edge strips are to be removed. For this purpose the device is applied in the position shown in FIGS. 1-3, where rollers 4 and 5 with their peripheral corrugations 9 are in engagement with the deposit on the opposite sides of the plate edge portions. The holder 8 is so adjusted that the plane of the rollers, marked by a dotted line 10—10 in FIG. 1 forms a small angle v to the plate edge 3. The holder 8 is assumed to be guided or taken in the direction shown by an arrow 11 in FIG. 1. The rollers will thereby rotate as shown by the arrows 12. The corrugations or teeth of the rollers engage in the deposit 2 and, due to the angular setting of the rollers, the deposit layer is drawn outwards when the holder moves down. This is illustrated on the upper part of FIG. 1 at 14, which shows a portion of the deposit which has been pulled outwards and bowed.

As shown in FIG. 3, the shafts 6, 7 of the rollers can form a small angle to each other, the space 15 between the cylindrical peripheral surfaces of the rollers will then be wedge-shaped, which facilitates setting the rollers against the deposit, and the entry of the corrugations into engagement with it.

Figure 5:
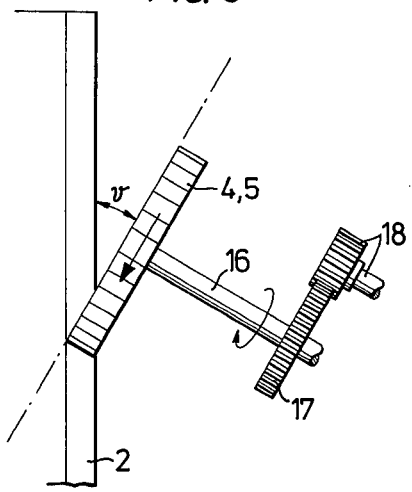
FIGS. 5 and 6 show, in the same way as FIG. 1, two alternative embodiments with driven rollers, which work pullingly on the deposit in FIG. 5 and thrustingly in FIG. 6.
Figure 6:
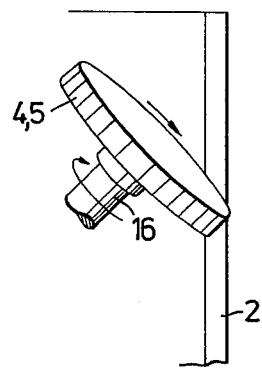

When the device moves down as in FIG. 1, the edge deposit is pulled outwards when it is separated from the plate. This condition is the same with the embodiment according to FIG. 5, where the angle v is considerably larger than in FIG. 1, and so large that it is suitable to arrange the rollers 4, 5 fixedly on their shafts 16, and to connect these to a driving mechanism 17, 18 which can bring the rollers 4, 5 into rotation during operation. The direction of rotation is given by arrows. Meanwhile, it is also possible to arrange the rollers 4, 5 so that they act thrustingly against the edge deposit 2, as shown in FIG. 6, where the rollers are also assumed to be rigidly mounted on their shafts, which are driven.

Figure 4:
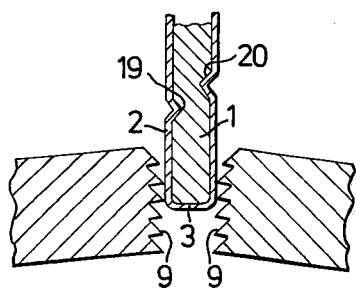
FIG. 4 shows the same view as in FIG. 3, but a detail of two rollers and a plate lying between them, on a larger scale.

In FIG. 4 the fractural depression is shown in the shape of V-shaped cuts 19, 20 on each side of plate 1. The deposits which are to form starting plates are bounded at the edges by these cuts which extend parallel with the plate edges.

Figure 7:
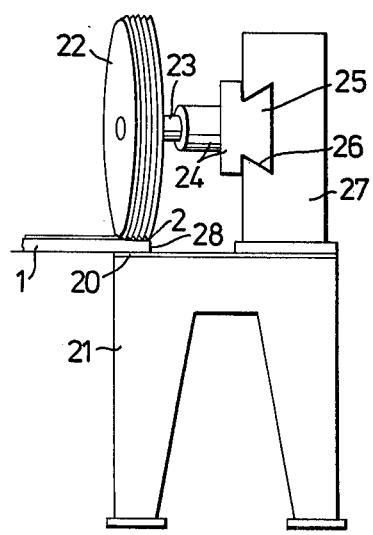
FIG. 7 shows an elevation of an embodiment with a single roller, working on one side of a plate with a deposit.

For certain uses it can be imagined that the device is simplified so that the one roller is replaced by a dolly or cushion. An example of this is shown in FIG. 7 where the plate 1 with its deposit 2 is resting with its edge against a cushion 20, formed by the upper side of a stand 21, while the deposit is being removed. The roller 22 is rotatable on a shaft 23, attached to a holder 24 having a dove-tailed portion 25 which is displaceable along a rectilinear slot 26 in the upper part of the stand 27. The plate 1 with its edge 28 is to be adjusted parallel with the slot 26, the plane of the roller 22 forming an angle with the slot 26 and edge 28. When the holder 24 is moved along the slot, the roller with its peripheral teeth either thrusts or pulls the edge deposit away from the upper side of the plate. If there is an edge deposit on the lower side also, the plate is turned over so that the underside comes upwards, and the process is repeated as before.

What is claimed is:

1. A method of removing deposited material in the form of a strip from an edge of a plate, comprising positioning against said edge of the plate the periphery of a roller that has corrugations along its periphery, the corrugations having sharp edges that extend all the way around the periphery of the roller, said edge of the plate being disposed at an acute angle to the axis of the roller at least at the point of contact of said roller with said edge, rotating the roller about its axis in a direction to remove material from the edge of the plate in a direction edgewise away from the plate, and moving the roller along the plate in a direction parallel to the edge of the plate while maintaining the periphery of the roller in contact with the edge of the plate.

2. A method as claimed in claim 1, in which the axis of the roller is disposed at an acute angle to the plane of the plate.

* * * * *